US008325617B2

(12) United States Patent
Ruetschi et al.

(10) Patent No.: US 8,325,617 B2
(45) Date of Patent: Dec. 4, 2012

(54) METHOD AND APPARATUS FOR SELECTIVE RECOVERY FROM BRANCH ISOLATION IN VERY LARGE VOIP NETWORKS

(75) Inventors: Johannes Ruetschi, Boca Raton, FL (US); Keith Glasnapp, Delray Beach, FL (US); Christian Garbin, Boca Raton, FL (US); Thomas Nagel, Boca Raton, FL (US)

(73) Assignee: Siemens Enterprise Communications, Inc., Boca Raton, FL (US)

( * ) Notice: Subject to any disclaimer, the term of this patent is extended or adjusted under 35 U.S.C. 154(b) by 1001 days.

(21) Appl. No.: 12/270,847

(22) Filed: Nov. 13, 2008

(65) Prior Publication Data

US 2009/0122791 A1 May 14, 2009

Related U.S. Application Data

(60) Provisional application No. 61/002,913, filed on Nov. 13, 2007.

(51) Int. Cl.
*H04L 12/28* (2006.01)
(52) U.S. Cl. .................... 370/252; 370/222; 370/216
(58) Field of Classification Search ................ None
See application file for complete search history.

(56) References Cited

U.S. PATENT DOCUMENTS

| 2006/0294241 A1* | 12/2006 | Cherian et al. | 709/227 |
| 2007/0070981 A1* | 3/2007 | Croak et al. | 370/352 |
| 2007/0195742 A1* | 8/2007 | Erdman et al. | 370/338 |

* cited by examiner

*Primary Examiner* — Kibrom T Hailu
*Assistant Examiner* — Zewdu A Beyen

(57) ABSTRACT

A digital telecommunications system, a method of reconnecting branches to a softswitch in a communications network and a program product for reconnecting branches to a softswitch in a communications network. A softswitch manages communications between devices at network endpoints, e.g., session initiation protocol (SIP) devices. When a branch is disconnected from the softswitch, the softswitch manages reconnects, prioritizing reconnects when multiple branches request reconnecting.

20 Claims, 3 Drawing Sheets

132 — survivable-proxy-state = "survivable-proxy-state" HCOLON proxy-state
        (SEMI b-q)
        (SEMI registration-count)
134 — proxy-state = "normal" / "backup" / "isolated"
       b-q = "q" EQUAL qvalue
       qvalue = ( "0" [ "." 0*3DIGIT ] )
136 — registration-count= " registration-count" EQUAL regcount
       regcount = 1*DIGIT

METHOD AND APPARATUS FOR SELECTIVE RECOVERY FROM BRANCH ISOLATION IN VERY LARGE VOIP NETWORKS

CROSS REFERENCE TO RELATED APPLICATION

The present invention is a continuation of Provisional U.S. Patent Application No. 61/002,913, entitled "METHOD FOR TAGGING SIP CONTACT HEADERS WHILE PRESERVING THE CONTACT HEADER FORMAT TOWARDS SOFTSWITCHES" to Johannes Ruetschi et al., filed Nov. 13, 2007 assigned to the assignee of the present invention and is incorporated herein by reference.

BACKGROUND OF THE INVENTION

1. Field of the Invention

The present invention is related to connectivity recovery in digital communications and telecommunications systems and networks and more particularly, to managing the system/network load during connectivity in digital communications and telecommunications systems and networks.

2. Background Description

State of the art telecommunication systems are digital and, frequently, use Internet Protocol (IP) based communications. A typical such system may include softswitch located in a data center that can provide communication services to many branches or sites. The cites may be each connected to the softswitch through a high speed data connection, e.g., through a typical broadband network connection. Typically when a branch looses connectivity to the data center, a local proxy can provide a reduced set of communication features for the branch. Later, when the communications are restored between the branch and the data center, it may be necessary for branch devices to update registrations and subscriptions (e.g. to message summary events and/or line state events). Updates for a single branch may not degrade network performance. If, however, a large number of branches simultaneously recover connectivity to the data center, the simultaneous subscription and registration requests may flood the data center, forcing it into an overload state. Consequently, system communications may slow or even be non-existent during such an overload.

Thus, there is a need for preventing overloads in telecommunications network softswitches when a number of branches simultaneously recover connectivity to the softswitch.

SUMMARY OF THE INVENTION

It is a purpose of the invention to reduce overloads in telecommunications network softswitches;

It is another purpose of the invention to minimize the occurrence of overloads in telecommunications network softswitches when a number of branches simultaneously recover connectivity to the softswitch;

It is yet another purpose of the invention to prioritize connectivity recovery for a telecommunications network to minimize the occurrence of overloads in a network softswitch when a number of branches simultaneously recover connectivity to the softswitch;

It is yet another purpose of the invention to prioritize connectivity recovery for a telecommunications network to minimize the occurrence of overloads in a network softswitch when a number of branches simultaneously recover connectivity to the softswitch, giving priority to branches of higher importance or for branches with larger numbers of users.

The present invention relates to a digital telecommunications system, a method of reconnecting branches to a softswitch in a communications network and a program product for reconnecting branches to a softswitch in a communications network. A softswitch manages communications between devices at network endpoints, e.g., session initiation protocol (SIP) devices. When a branch is disconnected from the softswitch, the softswitch manages reconnects, prioritizing reconnects when multiple branches request reconnecting.

BRIEF DESCRIPTION OF THE DRAWINGS

The foregoing and other objects, aspects and advantages will be better understood from the following detailed description of a preferred embodiment of the invention with reference to the drawings, in which:

FIG. 2 shows an example of a suitable SIP header;

DESCRIPTION OF PREFERRED EMBODIMENTS

Figure 1:
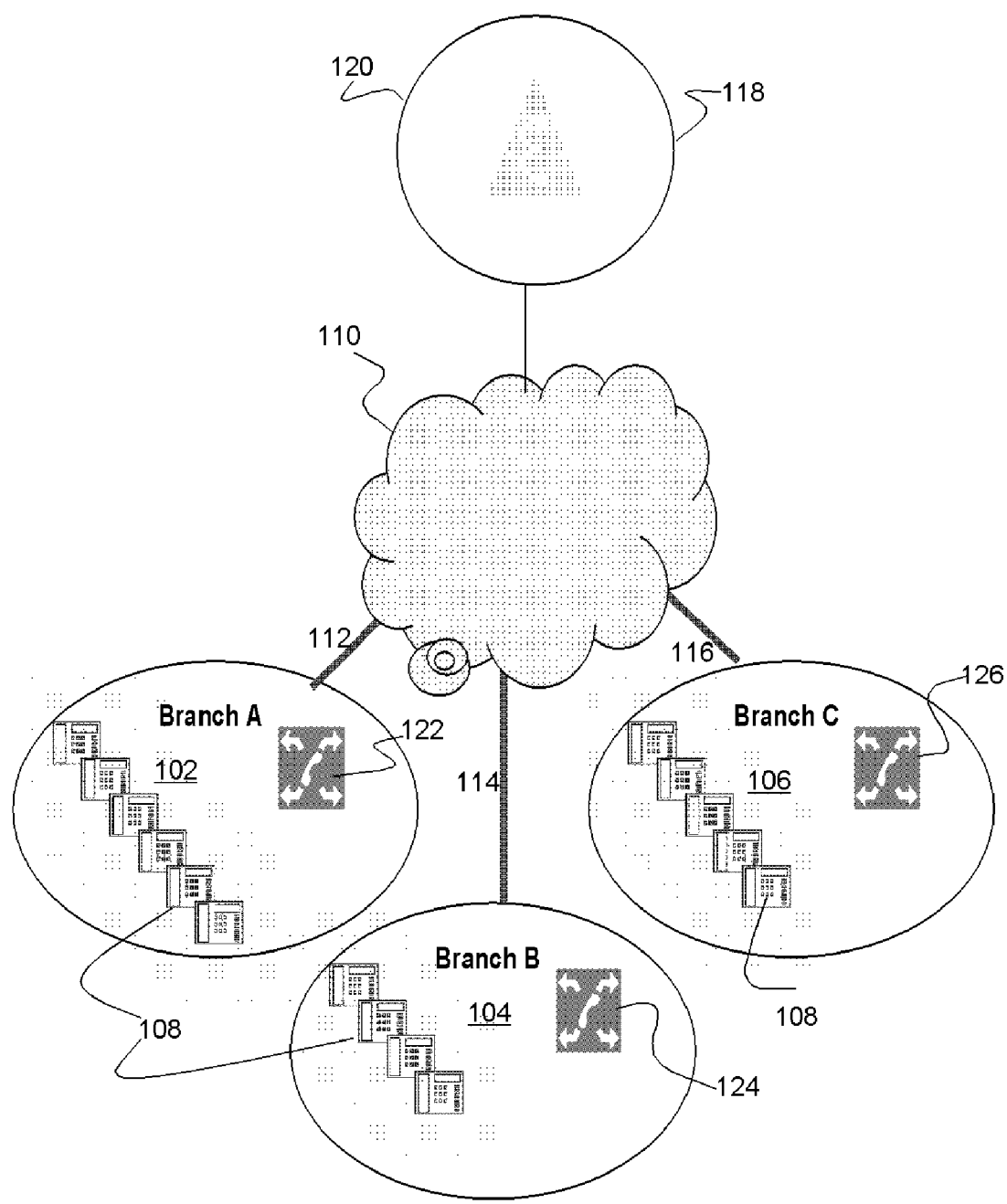
FIG. 1 shows a simple example of a preferred system/network according to a preferred embodiment of the present invention.

Turning now to the drawings and more particularly, FIG. 1 shows a simple example of a preferred system/network, e.g., an Internet Protocol (IP) communications system/digital call capable network 100 according to a preferred embodiment of the present invention. In this example, the system includes 3 branches 102, 104, 106, each with devices 108 at End Points (EP). Preferably, the EP devices 108 are typical digital telephony devices (e.g., VoIP phones) and Multimedia Terminal Adapters (MTA), e.g., keysets or session initiation protocol (SIP) phones. Since a network device defines an EP, each EP and a device(s) at the EP are referred to herein interchangeably. The branches 102, 104, 106 are networked over a suitable data network 110, e.g., a broadband network, wide area network (WAN), or local area network (LAN). Trunks 112, 114, 116 connect a respective branch 102, 104, 106 to the data network 110. A preferred softswitch 118, e.g., in a general purpose computer, PC or server, in main office 120 manages network communications and is connected to the branches 102, 104, 106 through the data network 110. Each branch 102, 104, 106 includes a survivable proxy 122, 124, 126 that provides the respective branch 102, 104, 106 with a reduced set of communication features, in the event that connection to the softswitch 118 is lost or if, for example the softswitch fails.

It is understood that this network is an example only and not intended as a limitation. The present invention has application to any digital telecommunications system or network with multiple branches connected to a softswitch providing communication services. Further, each branch may have any suitable number of endpoints with endpoint devices. However, for purposes of this simple example, one branch 102 (Branch A) may be a headquarters site with 6 users (each at one of 6 devices 108), branch 104 (Branch B) is a remote office with 4 users (each at one of 4 devices 108), and branch 106 (Branch C) is regional site with 5 users (each at one of 5 devices 108). For this example it is assumed that each device sends one subscription request for each device to register with the softswitch 118. The softswitch 118 of this example has the capacity to process 2 requests per second and to queue up to 12 requests.

Even with a network error that isolates all branches from the data center, each survivability proxy 122, 124, 126 can still provide basic services in the respective branches 102, 104, 106. While the branches 102, 104, 106 are isolated, each proxy 122, 124, 126 polls the softswitch 118 with SIP OPTIONS messages, trying to re-establish connectivity with the softswitch 118. When the softswitch 118 responds to the OPTIONS message with a positive acknowledgement, the respective proxy 122, 124, 126 returns to normal mode and routes subscriptions and registrations for state synchronization to the softswitch 118. According to a preferred embodiment of the present invention, the softswitch 118 avoids receiving subscription request for all devices in all branches simultaneously by selectively acknowledging the OPTIONS message if is contains specific information, e.g., in a SIP header.

FIG. 2 shows an example of a suitable SIP header 130. In particular, acknowledgement may be given priority based on proxy state 132, branch priority 134 and the number 136 of branch users. The proxy state 132, for example, may be normal mode, backup mode or survivable mode. Branch priority 134 may be a value Q between 0 and 1. The number 136 of branch users may be the number of registered users in the branch 102, 104, 106.

Figure 3:
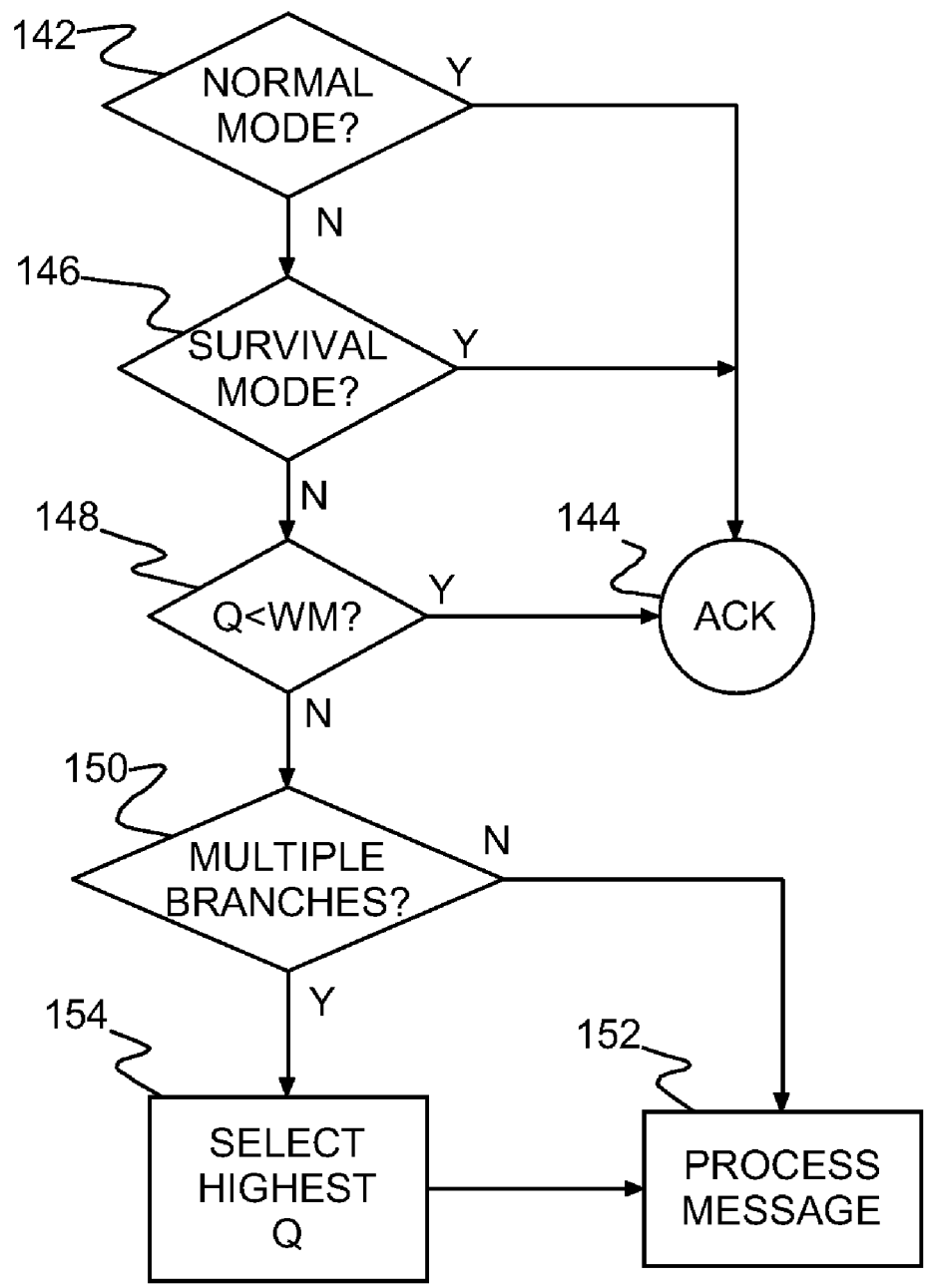
FIG. 3 shows an example of steps 140 in determining the softswitch 118 reply to each proxy.

FIG. 3 shows an example of steps 140 in determining the softswitch 118 reply to each proxy 122, 124, 126. First, in step 142, the softswitch 118 determines if a request indicates that the particular proxy is in normal mode 122, 124, 126. If so, then in step 144 the softswitch 118 positively acknowledges the message to keep the proxy 122, 124, 126 from entering survivable mode. Otherwise, in step 146, the softswitch 118 determines if the request indicates that the proxy 122, 124, 126 is in survivable mode. If so, then in step 148 the softswitch 118 checks whether the transaction queue size (Q)+the number expected messages (for this example: registration count*number of subscriptions per device) is below a high level watermark (WM), e.g., 10. This has the form:

(registration-count*messages-per-device)+transaction-queue-size<high-level-watermark.

If so, then in step 144 the softswitch 118 acknowledges the message. Otherwise, in step 150 the softswitch 118 determines whether more then one message is in the queue. If not, in step 152, the softswitch 118 processes the sole message. Otherwise, in step 154, the softswitch 118 selects the message with the highest Q value and in step 152 processes it first.

Advantageously, the present invention prevents overloads in the telecommunications system softswitch when a number of branches simultaneously recover connectivity to the softswitch. Further, by prioritize connectivity recovery for a telecommunications network the occurrence of overloads in a network softswitch are minimized even when a large number of branches simultaneously recover connectivity to the softswitch. The softswitch efficiently manages recovery, giving priority to branches of higher importance or for branches with larger numbers of users.

While the invention has been described in terms of preferred embodiments, those skilled in the art will recognize that the invention can be practiced with modification within the spirit and scope of the appended claims. It is intended that all such variations and modifications fall within the scope of the appended claims. Examples and drawings are, accordingly, to be regarded as illustrative rather than restrictive.

What is claimed is:

1. A communication system comprising:
a plurality of branches of a network that are connected to each other via the network, each of the branches comprising:
a plurality of end point devices assigned to a branch location for the branch, and
a survivability proxy device communicatively connected to the end point devices of the branch; and
a switch device connected to the network, the switch device managing communications for the end point devices of the plurality of branches of the network;
each of the survivability proxy devices of the plurality of branches providing at least one communication feature for the end point devices of the branch of that survivability proxy device when a network error that isolates the branch of that survivability proxy device from the network occurs;
each of the survivability proxy devices sending at least one message to the switch device to poll the switch device after the network error occurs to attempt to re-establish connectivity with the switch device;
for each survivability proxy device, the switch device receiving one of the at least one message sent by the survivability proxy device to re-establish connectivity with the switch device and assessing that received message, the received one of the at least one message being in a queue for the switch device;
for each survivability proxy device, the switch device assessing the received one of the at least one message sent by the survivability proxy device to re-establish connectivity with the switch device via a method comprising:
the switch device determining if the received one of the at least one message indicates that the survivability proxy device is in a normal mode or a survivable mode that is different from the normal mode;
upon determining that the survivability proxy device is in the survivable mode, the switch device determining whether to respond to the received one of the at least one message from the survivability proxy device;
upon a determination that only the received one of the at least one message from the survivability proxy device is in the queue of the switch device, the switch device responding to the received one of the at least one message from the survivability proxy device to re-establish connectivity;
upon a determination that multiple received messages from the survivability proxy devices are in the queue for re-establishing connectivity with the switch device, the switch device determining which of those messages is from the survivability proxy device having a greatest priority and first processing that message for re-establishing connectivity with the survivability proxy device having the greatest priority.

2. The system of claim 1 wherein each of the end point devices is a digital telephony device or a multimedia terminal adapter and the switch device is a softswitch.

3. The system of claim 1 wherein each branch is connected to the network by a trunk and the network is a wide area network.

4. The system of claim 1 wherein the switch device is a computer or a server in an office location.

5. The system of claim 1 wherein the network is a wide area network and the branches comprise a first branch, a second branch and a third branch, each of the first branch, second branch, and third branch being a local area network that is connected to the wide area network via a trunk.

6. The system of claim 1 wherein the survivability proxy device having the greatest priority is determined by determining one of (a) which survivability proxy device is from the branch having the highest priority, and (b) which survivability proxy device is of the branch having a highest number of end point devices relative to any other survivability proxy device having a message in the queue to re-establish connectivity with the switch device.

7. The system of claim 1 wherein the survivability proxy device having the greatest priority is determined by assessing priorities indicated in headers of the messages in the queue of the switch device.

8. The system of claim 1 wherein each of the at least one message sent by each of the survivability proxy devices to re-establish connectivity with the switch device is comprised of a Session Initiation Protocol header that indicates a priority of the survivability proxy device.

9. The system of claim 1 wherein the method by which the switch device assesses the received one of the at least one message sent by the survivability proxy device to re-establish connectivity with the switch device also comprises:
  upon determining that the survivability proxy device is in the normal mode the switch device responding to the received one of the at least one message by sending a message to the survivability proxy that positively acknowledges that message to keep the survivability proxy device from entering the survivable mode.

10. The system of claim 1 wherein upon determining that the survivability proxy device is in the survivable mode and prior to determining whether any received messages from other survivability proxy devices are in a queue of the switch device, the switch device multiplying (i) a registration count by (ii) a number of messages per end point device for the survivability proxy device and adding a transaction queue size of the survivability proxy device to a product of the multiplying to obtain a value that is then compared to a value of a high level water mark.

11. The system of claim 10 wherein the switch device responds to the survivability proxy device to re-establish connectivity with the survivability proxy device if the value obtained by adding the transaction queue size to the product is less than the value of the high level water mark.

12. A method of reconnecting branches of a network to a switch device in the network, each of the branches having a plurality of end point devices and a survivability proxy device, the method comprising:
  the survivability proxy devices of the branches sending messages to the switch device to poll the switch device after a network error occurs to attempt to re-establish connectivity with the switch device;
  the switch device receiving a plurality of the messages, each of the received messages being from a respective one of the survivability proxy devices;
  the switch device assessing the received messages sent by the survivability proxy devices to re-establish connectivity with the switch device to determine how to respond to the received messages by an assessment process comprising:
    for each received message, the switch device determining if the received message indicates that the survivability proxy device that sent the received message is in a normal mode or a survivable mode that is different from the normal mode,
    upon determining that the survivability proxy device is in the survivable mode, the switch device determining whether any received messages from other survivability proxy devices are in a queue of the switch device, and
    upon a determination that at least one other received message from the survivability proxy devices are in the queue of the switch device, the switch device determining which of the received messages is from the survivability proxy device that has a greatest priority and first processing that received message to re-establishing connectivity with the survivability proxy having the greatest priority before re-establishing connectivity with any other survivability proxy device of the survivability proxy devices that sent any other received messages within the queue of the switch device.

13. The method of claim 12 wherein the determining of which survivability proxy device has the greatest priority is determined by determining one of (a) which survivability proxy device is from the branch having the highest priority, and (b) which survivability proxy device is of the branch having a highest number of end point devices relative to the other survivability proxy devices having a message in the queue to re-establish connectivity with the switch device.

14. The method of claim 12 wherein the survivability proxy device that has the greatest priority is determined by assessing priorities indicated in headers of the received messages in the queue of the switch device.

15. The method of claim 12 wherein each of the messages sent by the survivability proxy devices to re-establish connectivity with the switch device is comprised of a Session Initiation Protocol header that indicates a priority of the survivability proxy device.

16. The method of claim 12 wherein the assessing of the received messages by the switch device also comprises:
  for each received message, upon determining that the survivability proxy device that sent the received message is in the normal mode the switch device responding to the received message from the survivability proxy device by sending an acknowledgement message to the survivability proxy that positively acknowledges that received message to keep the survivability proxy device from entering the survivable mode.

17. The method of claim 12 wherein upon determining that the survivability proxy device is in the survivable mode, and prior to the switch device determining whether any received messages from other survivability proxy devices are in the queue of the switch device, the switch device determining whether to respond to the received message from the survivability proxy device by multiplying (i) a registration count by (ii) a number of messages per end point device for the survivability proxy device to obtain a product and adding a transaction queue size of the survivability proxy device to the product of the multiplying to obtain a value that is compared to a high level water mark.

18. A computer program product for reconnecting branches to a softswitch in a communications network, the computer program product comprising a non-transitory computer usable medium having computer readable program code stored thereon that defines a method executed by a switch device of a network that executes the program code, the method comprising:
  the switch device receiving a plurality of messages from survivability proxy devices to poll the switch device to attempt to re-establish connectivity with the switch device after a network failure occurs, each of the received messages being from a respective one of the survivability proxy devices, each of the survivability proxy devices being from a branch of the network that also comprises end points devices communicatively connected to that survivability proxy device;

the switch device assessing the received messages sent by the survivability proxy devices to re-establish connectivity with the switch device to determine how to respond to the received messages by an assessment process comprising:

for each received message, the switch device determining if the received message indicates that the survivability proxy device that sent the received message is in a normal mode or a survivable mode that is different from the normal mode, upon determining that the survivability proxy device is in the survivable mode, the switch device determining whether any received messages from other survivability proxy devices are in a queue of the switch device, and upon a determination that at least one other received message from the survivability proxy devices are in the queue of the switch device, the switch device determining which of the received messages is from the survivability proxy device that has a greatest priority and first processing that received message to re-establish connectivity with the survivability proxy having the greatest priority before re-establishing connectivity with any other survivability proxy device of the survivability proxy devices that sent any other received messages within the queue of the switch device.

19. The computer program product of claim 18 wherein the method further comprises:

for each received message, upon determining that the survivability proxy device that sent the received message is in the normal mode the switch device responding to the received message from the survivability proxy device by sending an acknowledgement message to the survivability proxy that positively acknowledges that received message to keep the survivability proxy device from entering the survivable mode.

20. The computer program product of claim 18 wherein the method further comprises:

upon determining that the survivability proxy device is in the survivable mode, the switch device determining whether to respond to the received message from the survivability proxy device by multiplying (i) a registration count by (ii) a number of messages per end point device for the survivability proxy device to obtain a product and adding a transaction queue size of the survivability proxy device to the product of the multiplying to obtain a value that is compared to a high level water mark.

* * * * *